United States Patent [19]

Simon

[11] 3,999,875
[45] Dec. 28, 1976

[54] UPRIGHT AND CROSS-PIECE ASSEMBLY FOR COLLAPSIBLE RACKING OR THE LIKE

[75] Inventor: Victor Simon, Paris, France
[73] Assignee: Mavil S.A.-Z.A.I., France
[22] Filed: Jan. 8, 1974
[21] Appl. No.: 431,665

[30] Foreign Application Priority Data

Jan. 12, 1973  France .............................. 73.01051
Dec. 17, 1973  France .............................. 73.45051

[52] U.S. Cl. .............................. 403/186; 403/230; 403/190; 211/189
[51] Int. Cl.² .......................................... A47F 5/10
[58] Field of Search ................. 211/177, 176, 148; 403/190, 230, 186; 52/729, 732

[56] References Cited

UNITED STATES PATENTS

| | | | |
|---|---|---|---|
| 3,151,745 | 10/1964 | Reilly | 211/148 |
| 3,266,635 | 8/1966 | McConnell | 211/176 X |
| 3,278,043 | 10/1966 | Kimpton | 211/148 |
| 3,606,027 | 9/1971 | Clements | 211/176 |

FOREIGN PATENTS OR APPLICATIONS

1,445,606  6/1966  France .............................. 211/148

Primary Examiner—Andrew V. Kundrat
Attorney, Agent, or Firm—William Anthony Drucker

[57] ABSTRACT

The invention relates to adjustable storage arrangements, such as racks, which may be readily erected and dismantled from a plurality of interconnectable, elongate shaped members comprising uprights and/or cross-pieces, at least some of which have substantially the same, open or channel cross-section, generally resembling a triple "sigma" contained within a rectangle. Trapezoidal re-entrant areas are provided on three sides of the said cross-sectional shape, and equidistant engagement apertures are situated in at least one line parallel to the longitudinal direction of each shaped member which comprises an upright, in the larger side of the upright opposite the open side thereof. Angle brackets are secured generally perpendicularly to the ends of the shaped members which form the cross-pieces, which brackets are capable of fitting round the front part, and either the right or left-hand part, respectively, of the triple-sigma-shaped upright. The brackets have projections which fit into the engagement apertures in the upright, and wedge the bracket against one of the side-walls of the upright when the cross-piece is moved downwardly relative to the upright.

9 Claims, 12 Drawing Figures

UPRIGHT AND CROSS-PIECE ASSEMBLY FOR COLLAPSIBLE RACKING OR THE LIKE

This invention relates to the art of storage, and more particularly to that of adjustable racking which is easy to erect and dismantle, and uses uprights and cross-pieces.

Previously, two uprights have been employed, connected by distance-pieces and diagonals to form "ladders", and parallel ladders have been connected together by pairs of cross-pieces at various levels, and form compartments for pallets. Rails may also be provided, extending in a direction perpendicular to the direction of the uprights and cross-pieces, to form multiple bays.

The invention relates primarily to the cross-sectional shape of the uprights and cross-pieces, and to the way in which they are attached.

Collapsible racking is known, one type of which requires the use of nuts and bolts, another type of which employs a combination of lugs and engagement apertures, and yet another type of which uses headed rivets fastened to one part which co-operate with apertures in another part, the apertures comprising an insertion aperture through which the heads of the rivets can pass, and a fixing aperture which forms a downward extension of the first aperture and the diameter of which matches that of the shank of the rivet.

The cross-pieces used in the latter case are generally of U-shaped cross-section, and their ends are shaped to form attachment lugs provided with rivets. However, the cross-pieces used with this type lack rigidity, and there is the danger that they may bow and tip, this being guarded against by employing struts which are also attached without nuts. The struts make assembly more difficult, as well as increasing the weight and cost of the installation.

The present invention makes it unnecessary to use struts by employing, on the one hand, a novel type of shaped member, both for the uprights and the cross-pieces, the cross-sectional shape of which provides greater geometrical inertia, or a more stable geometry, and enables it better to withstand flexure and torsion, and by employing, on the other hand, novel means of engaging the shaped members with one another, the uprights having a series of apertures which will be described below, and the cross-pieces having attachment means at the ends which suit these apertures.

The arrangement, for assembling uprights and cross-pieces having the same open cross-sectional shape resembling three Greek sigmas contained in a rectangle, is characterised by a re-entrant trapezoidal area on the three sides of the said cross-sectional shape, equidistant engagement apertures situated in at least one line parallel to the lengthwise direction of the upright in the large face opposite the opening, angled brackets fastened at right angles to the ends of the cross-pieces, these angled brackets being capable of fitting round the front part, and the right or left-hand part, respectively, of the triple-sigma-shaped upright, and having means which can be inserted into the engagement apertures in the upright and which wedge the said angled bracket against one of the side-walls of the upright upon downward translational movement of the said cross-piece.

In order that the invention may be more readily understood, two embodiments thereof will now be described with reference to the accompanying drawings, in which.

Figure 2:
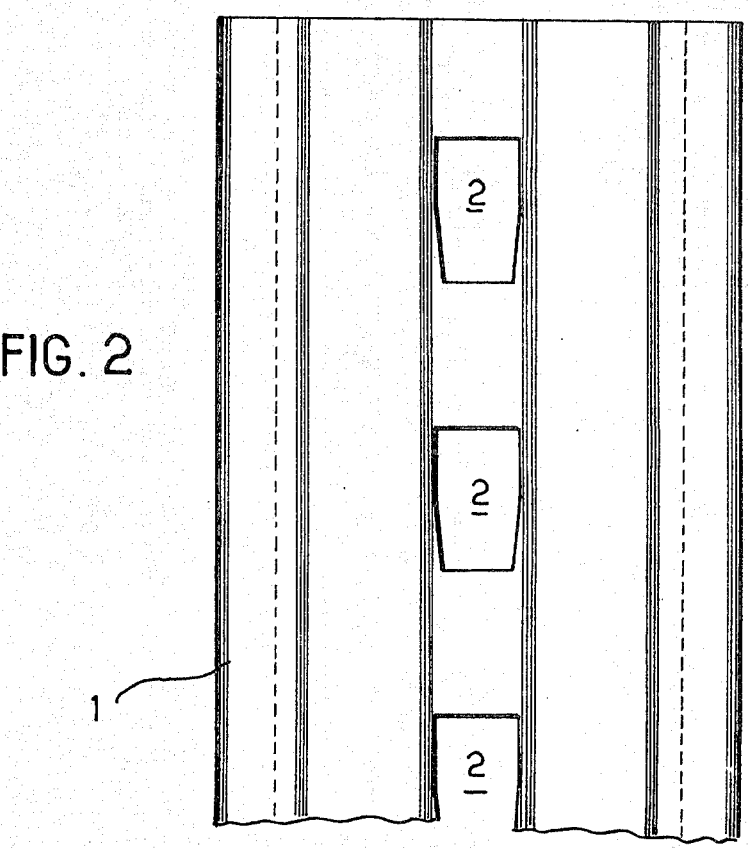
FIG. 2 is a side elevation of the shaped member shown in FIG. 1 when forming an upright.
Figure 1:
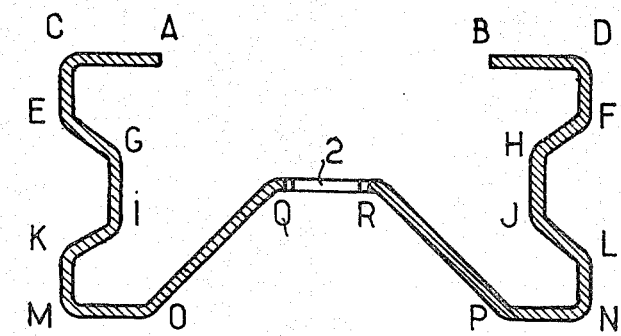
FIG. 1 is a cross-section through one embodiment of shaped member.
Figure 6:
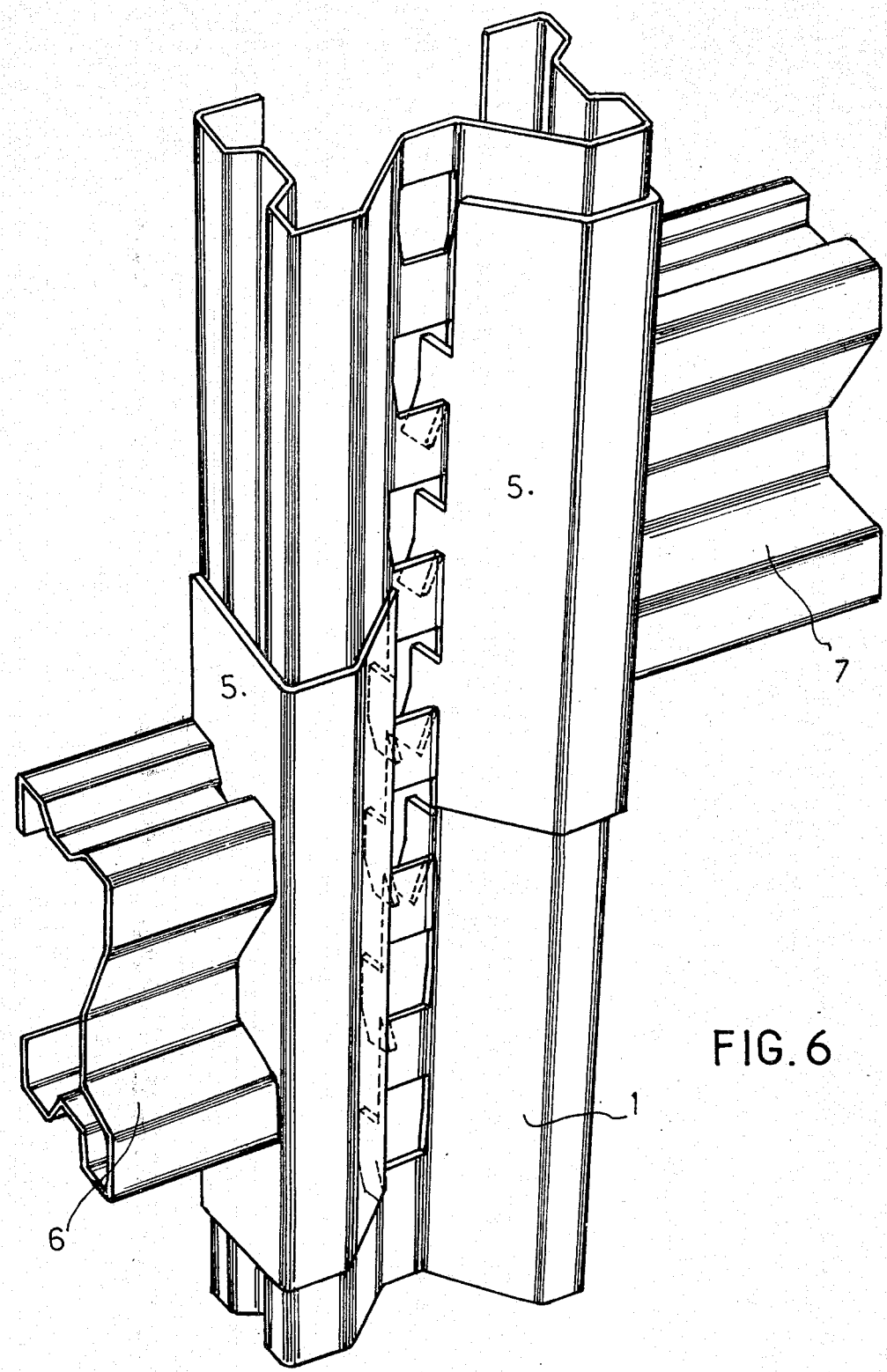
FIG. 6 is a perspective view of two cross-pieces attached to an upright.

Referring to FIG. 1, it will be seen that the cross-sectional shape of the shaped member, which may form an upright 1 as shown in FIGS. 2 and 6, or a cross-piece 6 or 7 as shown in FIG. 6, is contained within a rectangle, and is derived therefrom by making trapezoidal or more accurately, semi-trapezoidal recesses on one large side and the two adjoining sides of the rectangle, the fourth side of the rectangle having a central elongate opening AB which is substantially equal in width to the major base of the trapezium on the opposite or large side, and forms the shaped member into an open elongate channel. It can be seen that the overall cross-sectional appearance of the shaped member is similar of the Greek letter "sigma," and that this resemblance also applies to three individual sides of the shaped member. For ease of reference the said shape according to the invention will be termed a "triple sigma" shape in the following description.

FIG. 1 also shows that an aperture 2 is provided in the centre part of the shaped member. These apertures perform the function of engagement apertures and can be better seen in FIG. 2, which shows an upright formed with a series of vertical apertures, the pitch of which is substantially equal to twice the height of the apertures themselves. There is no need to have such apertures in the cross-pieces, although there is no harm in their being present since they do not reduce the strength of the shaped member under flexure and torsion, because they are situated close to the centre of gravity of the cross-sectional shape. On the other hand, apertures, in areas designated MO and PN in FIG. 1 would have a weakening effect, and anything attached to these lateral areas would set up asymmetrical strains on the uprights. The central positioning of the line of apertures is therefore an important feature of this embodiment of the invention.

Another feature of the apertures is their shape, which, as will be seen from FIG. 2, is almost rectangular, but which, in each aperture, is defined by an upper section, the sides of which are in fact parallel to the shaped member, and by a lower section the sides of which converge and form a trapezium the minor base of which is approximately 9/10 the size of the major base.

Figure 3:
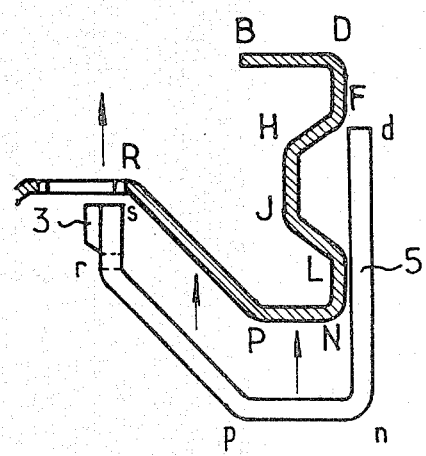

FIG. 3 is a cross-section of an attachment part or bracket 5, which is secured to one end of a cross-piece 6 or 7, preferably by welding. A similarly shaped part or bracket is welded to the other end of the cross-piece.

Figure 4:
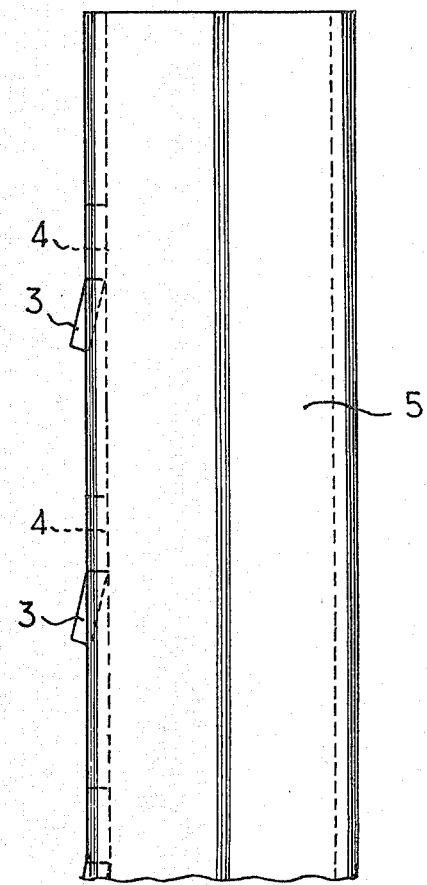
FIGS. 3, 4 and 5 are three views, from different aspects, of an attachment bracket for use with the shaped member of FIGS. 1 and 2.
Figure 5:
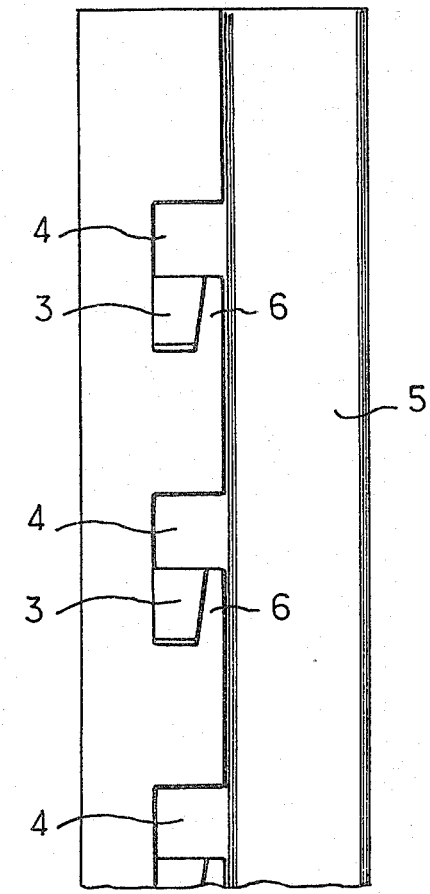

FIGS. 4 and 5 are two views of the same bracket. The overall cross-sectional shape designated "*rpnd*" in FIG. 3 is intended to fit around the "RPND" area of the outline shape of the upright in FIG. 1. A fold *rs* parallel to *nd* has cut from it a series of lugs 3 which are better seen in FIGS. 4 and 5. These lugs are bent outwards approximately by 10°. Their shape is that of a right-angled trapezium, the major base of which is joined to rectangular webs 4 which connect them to the attachment bracket, leaving an oblique gap 6. The height of each lug plus its web is slightly less than that of the apertures 2, and the lugs are spaced out at the same pitch as the apertures. The height of the bracket 5 may vary as required, and it has at least two attachment lugs.

The arrows in FIG. 3 show how the attachment bracket fits partly around half the outline of the triple-sigma-shaped member, with the lugs 3, 4 fitting into the apertures 2. When the bracket 5 is slid down the upright, a strong clamping or wedging action results from the co-operative action of the slanting edge at the lower right-hand side of an aperture 2 and the slanting side of the gap 6, the greatest width of which gap is the same as the thickness of the shaped member forming the upright. This clamping action avoids any play, and prevents the whole framework from swaying.

FIG. 6 is a perspective view illustrating the way in which two cross-pieces 6 and 7 are attached to an upright 1 by means of brackets 5 welded to the ends of the cross-pieces. It can be seen that the attaching of a first cross-piece to the right-hand side of an upright in no way prevents a second cross-piece from being attached to the left-hand side, either at the same or at a different level, since only one side of the central apertures is used in each case.

The available apertures in the uprights may, as a subsidiary feature of the invention, be used, after the cross-pieces have been secured, to make any type of transverse connection between the two uprights of a "ladder," the ends of such transverse pieces being formed to fit into the apertures and to engage at the bottom of the apertures, with a known locking principle.

Figure 8:
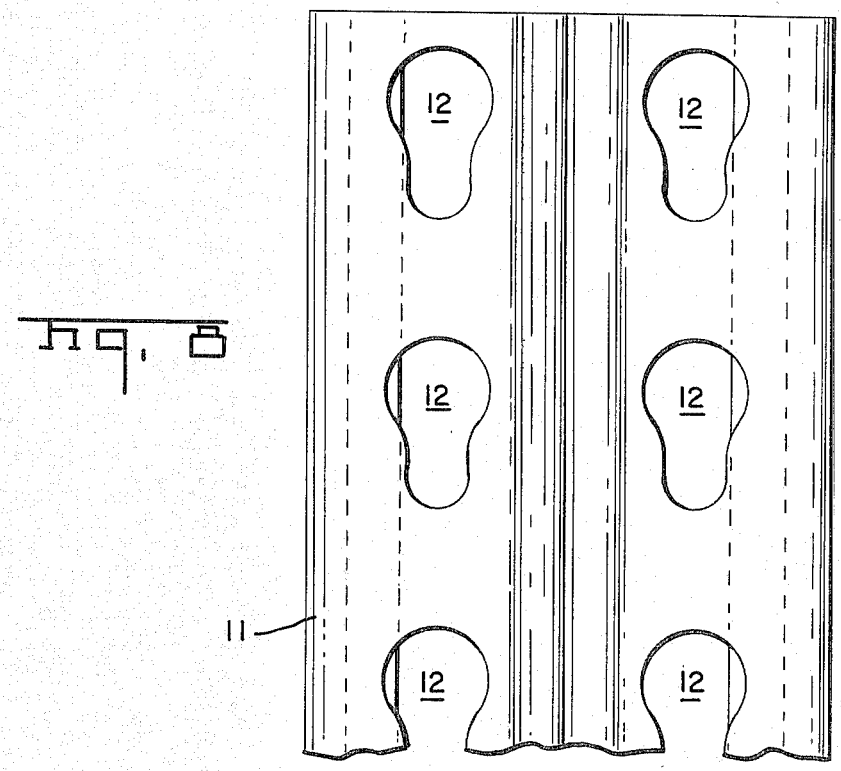
FIG. 8 is a side elevation of the shaped member of FIG. 7 when forming an upright.
Figure 7:
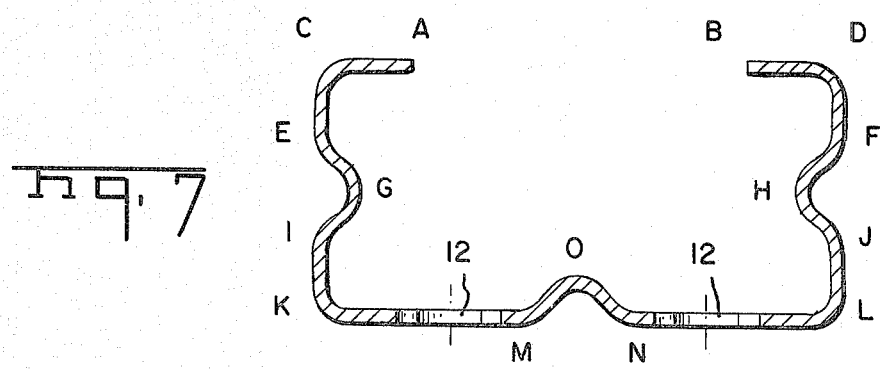
FIG. 7 is a cross-section of a preferred modified embodiment of shaped member.
Figure 10:
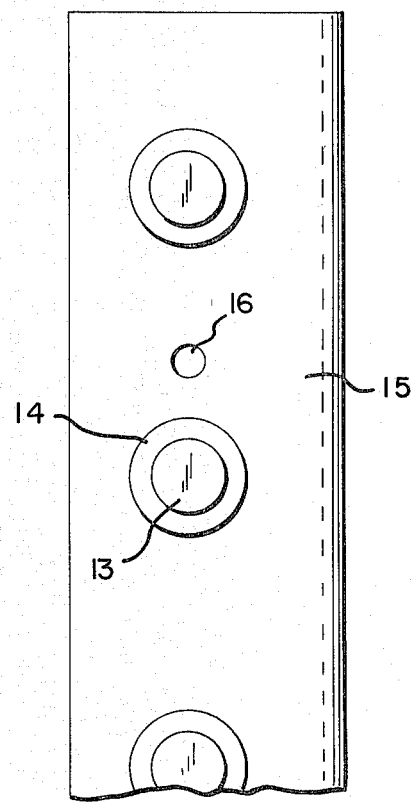
FIGS. 9, 10 and 11 are three views, from different aspects, of a preferred embodiment of an attachment bracket for use with the shaped member of FIGS. 7 and 8.
Figure 11:
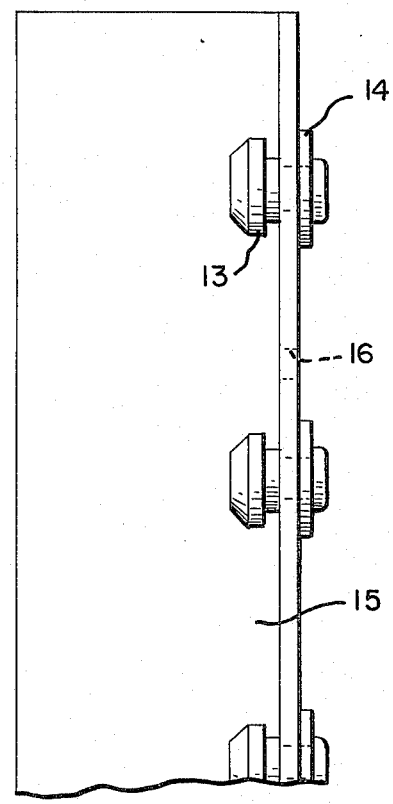
Figure 9:
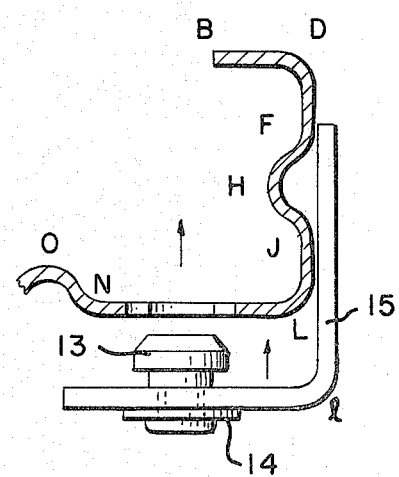

FIG. 7 shows a modified embodiment representing the cross-sectional shape of a shaped member 11 analogous to that of FIG. 1. The three trapezoidal recesses MON, EGI, FHJ are approximately triangular in shape, but the corners are not pointed. In the flat areas KM and NL of the large side can be seen key-hole slots or apertures 12, the shape of which will be more apparent from FIG. 8, which shows an upright with two vertical sets of engagement apertures. It is true that, as stated above, effecting connections to lateral areas causes asymmetrical strains on the uprights. These are, however, generally compensated for by the fact that the cross-pieces are usually attached on the two sides of the upright at the same level. Furthermore, this modified embodiment has an advantage which makes it preferable. In FIGS. 9, 10 and 11 can be seen an attachment bracket 15 welded to one end of each cross-piece, a similarly shaped bracket being welded to the other end. These brackets bear studs 14 which are fastened to the brackets at 14 and are less fragile than the lugs 3 for which provision is made in the first embodiment, these lugs being located at the ends of the cross-pieces and being readily liable to damage by impacts which are inevitable during transportation and fitting.

FIG. 9 shows the outline of the bracket 15 on a cross-piece which fits around the outline BDFHJLNO of the cross-sectional shape of an upright. The arrows show how the studs 13 fit into the apertures 12, the shape of the latter being made up of an upper enlarged opening which allows the stud to pass through, and a lower and smaller retaining opening. By lowering the bracket 15 the whole vertical series of studs is thus simultaneously fixed to the upright.

Figure 12:
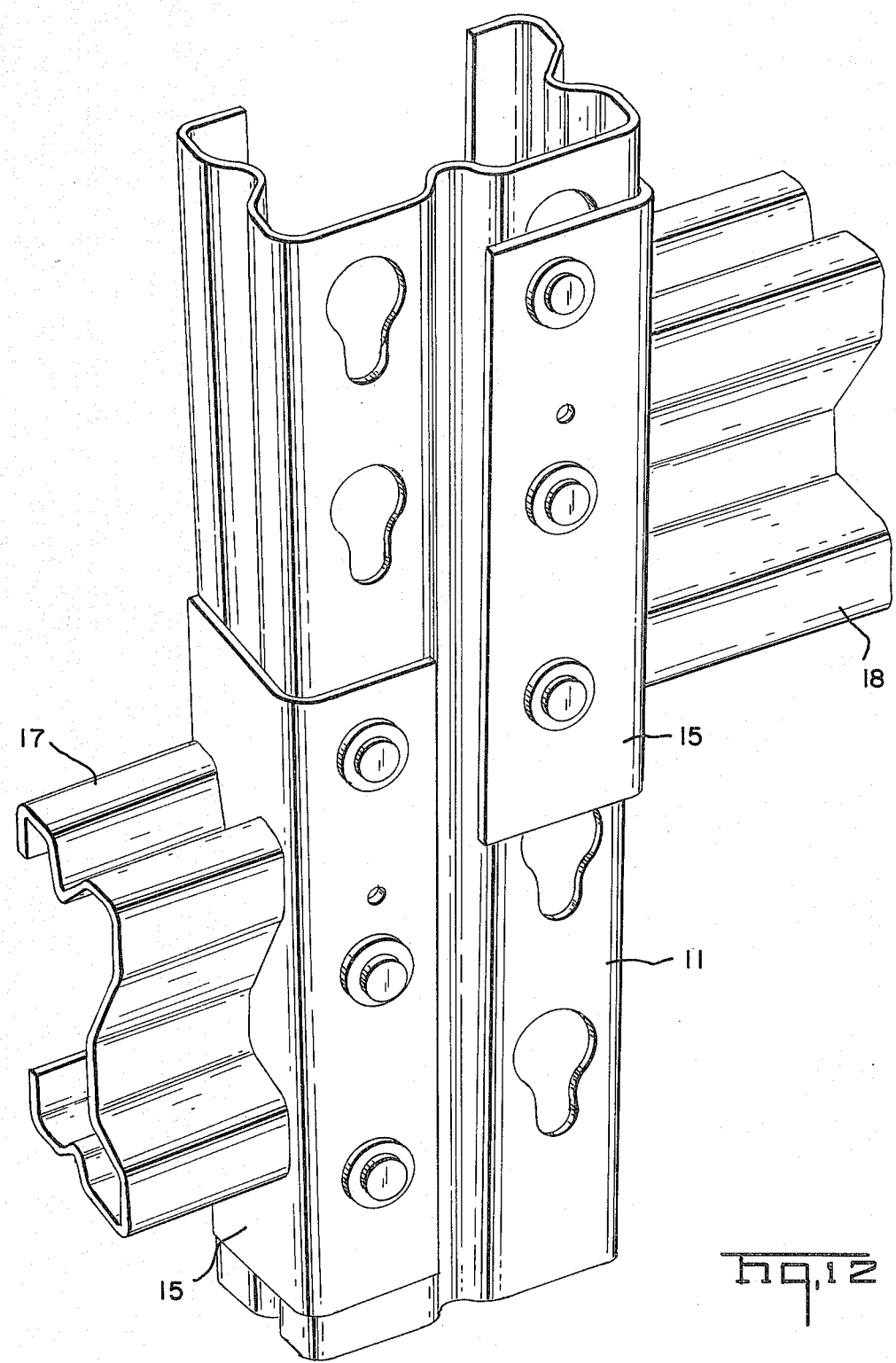
FIG. 12 is a perspective view illustrating a preferred method of attaching cross-pieces to an upright.

FIG. 12 is a perspective view illustrating the way in which two cross-pieces 17 and 18 are attached to an upright 11 by brackets 15 welded to the ends of the cross-pieces. As in FIG. 6, it can be seen that the attachment of a first cross-piece in no way prevents a second cross-piece from being attached at the same or a different level.

The foregoing embodiments are described by way of example, and it is to be understood that many modifications may be made without exceeding the scope of the invention as defined by the appended claims, and whilst achieving the object which is to strengthen the cross-sectional configuration common to the uprights and cross-pieces by means of trapezoidal recesses or portions which give it a "triple sigma" shape which is more or less pronounced, depending on the depths of the lateral trapezia. This depth may even be substantially zero, as also may be the minor bases of the trapezia, which trapezia are then transformed into simple triangles. Similarly the trapezia may be of a stylised, curvilinear form. The essential factor according to the invention is to move the re-entrant or recessed area or areas of the uprights close to the major axis of inertia or stability of the cross-sectional shape.

I claim:

1. An arrangement for assembling uprights and cross-pieces which have substantially the same, open cross-sectional shape, said uprights being generally of sigma shape in cross-section, symmetrically facing each other and having in the arms and base of the sigma a generally V shaped re-entrant part or depression, having a flat portion at its apex, equidistant engagement apertures situated in at least one line parallel to the longitudinal direction of the upright in the base thereof opposite the opening, angle brackets secured generally perpendicularly to the ends of the cross-pieces which are capable of fitting round the front part, and one of the right or left-hand part of the upright, the said brackets having means to fit into the engagement apertures in the upright and to wedge the said bracket against one of the side-walls of the upright when the said cross-piece is translationally moved downwards.

2. An arrangement according to claim 1, characterised in that the re-entrant area of the shaped members comprising the uprights or cross-pieces lies substantially along the major axis of a rectangle circumscribed about the cross-sectional shape.

3. An arrangement according to claim 1, characterised in that the re-entrant area of the shaped members comprising the uprights or cross-pieces lies substantially along the major axis of geometrical inertia or stability of the cross-sectional shape.

4. An arrangement according to claim 1, characterised in that the said line of engagement apertures is situated in the flat apex of said depression or reentrant area of the shaped members forming the uprights the said assembly brackets being secured to the ends of the cross-pieces and incorporating a plurality of lugs adapted to fit sideways into the said engagement apertures in an upright.

5. An arrangement according to claim 4, characterised in that the lugs on the brackets fixed to the cross-pieces are cut out to form hooks, the upper part of which is vertical and the lower part of which slopes by a few degrees, the upper parts of the engagement apertures in the uprights being of constant width and the lower parts being of decreasing width, the said hooks leaving a slot between themselves and the bodies of the brackets, the width of which decreases until it equals the cross-sectional thickness of the shaped members.

6. An arrangement according to claim 1, characterised by two lines of engagement apertures situated in the two flat surfaces on either side of the re-entrant area or depression of the base of the sigma cross-sectional shape of the uprights, the said assembly brackets welded to the ends of the cross-pieces being provided with studs adapted to fit into the said engagement apertures.

7. An arrangement according to claim 6, characterized in that the said studs comprise a body and a head, the said heads projecting from the said brackets by an amount at least equal to the thickness of the metal of the upright.

8. An arrangement according to claim 6, characterised in that the said vertically aligned engagement apertures are formed by an upper part suitable to receive the head of the stud and a lower part, the width of which decreases to a size less than the diameter of the head and greater than that of the body of the stud.

9. An arrangement according to claim 8, further characterised in that the said engagement apertures have, in their lower part, an edge which is inclined to the vertical and which is operable to urge the body of the stud sideways until the said angle bracket is wedged against the side-wall of the upright when the said cross-piece is translationally moved downwards.

* * * * *